Dec. 23, 1969  J. H. O. SMERD ET AL  3,484,927
METHOD OF ASSEMBLY UTILIZING A COMPOSITE SOLID CONNECTOR
Filed Nov. 13, 1967  2 Sheets-Sheet 1

Inventors:
Johann Hans Otto Smerd
and
Patrick Gedny
By Baldwin Wight Diller & Brown
Attorneys Inventors:
Johann Hans Otto Smerd
and
Patrick Gedny
By Baldwin Wight Diller & Brown
Attorneys

United States Patent Office 3,484,927
Patented Dec. 23, 1969

3,484,927
METHOD OF ASSEMBLY UTILIZING A COMPOSITE SOLID CONNECTOR
Johann Hans Otto Smerd, Stourport-on-Severn, and Patrick Gedny, Kidderminster, England, assignors to Parsons Chain Company Limited, Stourport-on-Severn, Worcestershire, England, a corporation of the United Kingdom
Filed Nov. 13, 1967, Ser. No. 682,010
Claims priority, application Great Britain, Nov. 15, 1966, 51,171/66
Int. Cl. B23k *31/02*
U.S. Cl. 29—470.7                                     9 Claims

ABSTRACT OF THE DISCLOSURE

Manufacture of a chain conveyor assembly using an open end connector for connecting the several chain lengths and into which the scraper bars are subsequently connected, the respective chain lengths being secured in position within the connector by use of a bridging component or components which is or are preferably welded thereto.

---

This invention comprises an improved method for manufacture of chain conveyor assemblies of the kind commonly used for conveying coal underground.

Conveyor assemblies, which are normally made up in short lengths of 5 metres as a two or three strand assembly incorporating spacer bars at 1 metre spacing, the chains being coupled to the scraper bars by a shackle type connector.

The shackle connectors may be of the "open" or "solid" type, the latter having a bridge across the neck of the connector. The increased inherent strength of the solid type is a desirable feature, particularly so should the bolt securing the connector to the scrapper bar become loose or even completely undone whilst in service.

The present method of assembling coal conveyors using solid connectors necessitates the use of joiner links between the connectors and the adjacent lengths of chain (i.e. the bridge across the neck of the connector prevents the adjacent lengths of chain from being laced into the connector). These joiner links must be inserted, welded, heat treated and calibrated as individual links and as such very rigid supervision and inspection is necessary to ensure qualities equally superior to the adjacent lengths of chain.

According to the present invention, manufacture of a chain conveyor assembly comprises the steps of:

(1) Connecting the end links of two or more chain lengths by means of an open end connector;

(2) Closing the connector by insertion of a bridge component or components between the limbs or neck portion of the connector, and (3) Uniting the bridge component(s) to the connector to form a solid connector.

In carrying out the method of manufacture of this invention the bridging of the open limbs or neck portions is preferably effected by welding the component or components in position, but hot or cold riveting may be used.

The invention is illustrated in the accompanying drawings in which.

Figure 1:
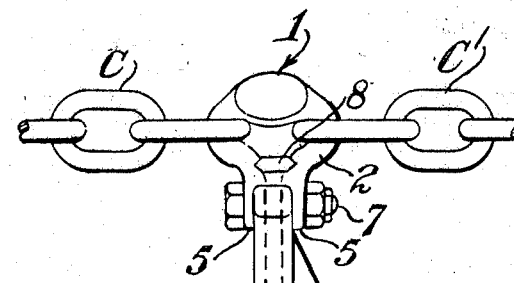
FIGURE 1 is a view showing the portions of two chain lengths joined in accordance with the invention.
Figure 2:
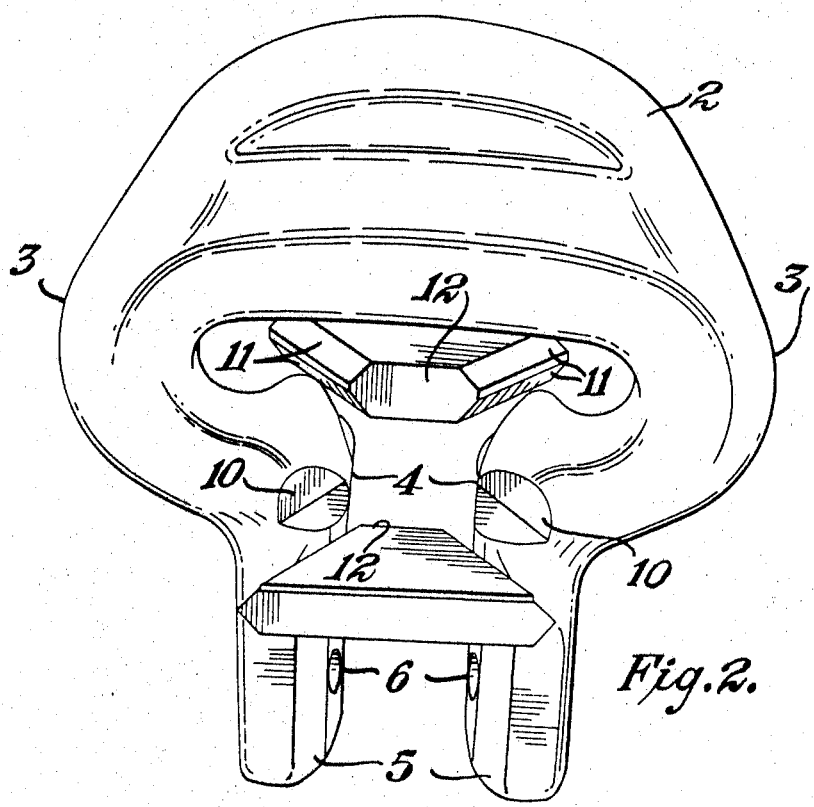
FIGURES 2 and 3 are enlarged views showing successive stages in the formation of the solid connector.
Figure 3:
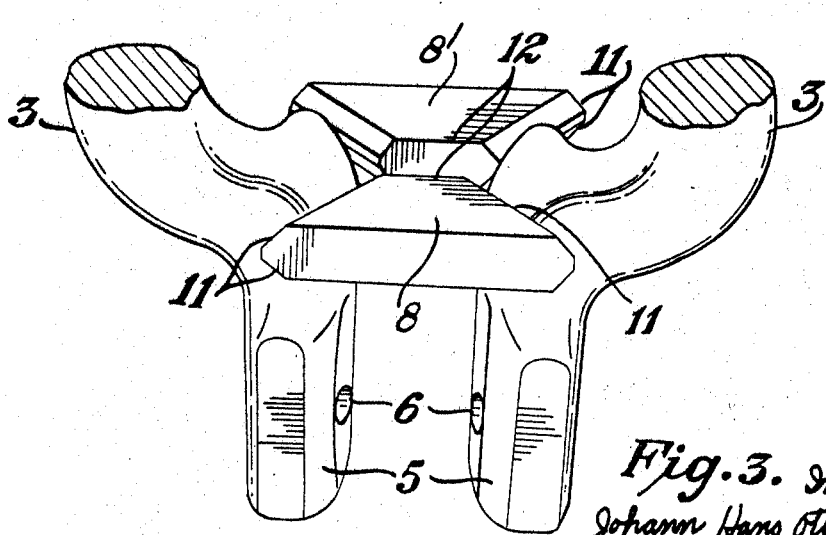

In the drawings, there is shown in FIGURE 1 a short length of a conveyor chain assembly including a scraper bar S joined at its ends to chains made up of chain lengths C, C', connected to one another by means of a connector, indicated generally at 1, in accordance with the method of this invention. The connector 1 as clearly shown in FIGURES 2 and 3 is open ended and comprises a U-shaped body, the two sides or limbs 3 of which are in-bent to form a neck portion 4, the limbs terminating in link portions 5, in each of which is a hole 6 to receive a bolt 7 (FIGURE 1), by which the respective connectors are connected to the ends of the scraper bar S.

In use the two limbs are threaded through the end links of the two lengths of chain C, C', to be joined to one another whereupon the ends 5 are closed by means of a bridge component which in the embodiment illustrated consists of two separate pieces of metal 8, 8'.

For convenience the side limbs 3 of the connector are cut away to provide recesses 10 in which the metal bridge components 8, 8' are located. Likewise, the bridge components 8, 8' may be formed with angled sides 11 so as to nest between the limbs 3 of the connector, the ends of the triangle so formed being cut away to provide flats 12. Satisfactory results have been obtained by forming V-shaped recesses 10 and with this arrangement the angled sides 11 are similarly chamfered so as readily to fit into position. The bridge component or components in practice are welded both to the connector and to one another so as to form a unitary whole.

It will be seen therefore insertion of the bridge components not only closes the entrant gap between the leg portions or limbs 3 but completes the link portion 3 and thereby forms a continuous stress path through the link portion 2 of the connector, which is independent of the means by which the scraper bar is connected thereto.

Figure 4:
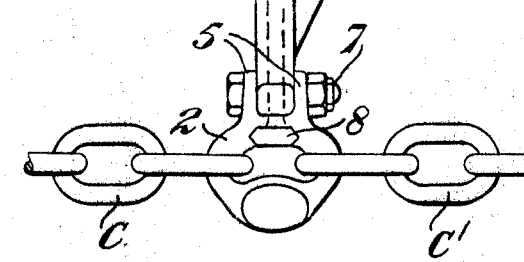
FIGURE 4 is a scrap view showing a riveted connector.
Figure 4:
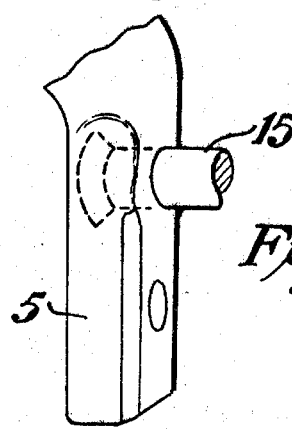

Whilst the preferred method of uniting the bridge component or components is by means of a welding operation, it is visualised that hot or cold riveting methods may be employed. When using a rivet the link portions or leg 5 are extended to enable the rivet, indicated at 15 in FIGURE 4, to be located between the bolt holes 6 and the shoulder where the limbs 3 join the leg 5, the heads of the rivet being countersunk flush in the outer faces of the connector legs.

The method of manufacture of this invention has the advantage that it allows "solid" connectors with adequate mechanical properties to match those of the chain to be assembled into the adjacent lengths of chain during the final manufacturing stages of the connector, thus eliminating the need for joiner links. Further, this operation can be performed in such a manner that no subsequent heat treatment or calibration of the connector or chain would be necessary.

What is claimed is:

1. A method of manufacturing a chain conveyor assembly which includes two parallel runs of chain lengths joined by connectors and scraper bars extending between the two runs and secured to the runs comprising the steps of providing connectors including a link portion and a bifurcated limb forming a gap flanked by a pair of leg portions, passing the end links of adjacent chains through the gap between the leg portions into the link portion, uniting the leg portions by a bridge component independent of means provided to connect the scraper bars to the connectors thereby forming a continuous stress path through the limb independent of the scraper bar connecting means and providing means to connect the scraper bars to the connectors.

2. The method as defined in claim 1 wherein the bridge component is united to the leg portions by welding.

3. The method as defined in claim 1 wherein the bridge component is a rivet.

4. The method as defined in claim 1 including the step of forming recesses in the leg portions and inserting the bridging components into the recesses prior to uniting the latter to the leg portions.

5. The method as defined in claim 1 wherein the bridge component is a metal insert, and the leg portions are united by the step of welding the metal insert to the leg portions.

6. The method as defined in claim 1 wherein the bridge component is defined by a pair of metal inserts, and the leg portions are united by the step of welding both of the metal inserts to the leg portions.

7. The method as defined in claim 5 including the step of forming recesses in the leg portions of the connectors, seating the metal insert in the recesses prior to the welding thereof to the leg portions.

8. The method as defined in claim 6 including the step of forming pairs of recesses in each of the leg portions in opposed relationship to each other, and seating the inserts in the recesses and in bridging relationship to the leg portions prior to the welding operation.

9. The method as defined in claim 4 wherein the metal insert is of a generally triangular configuration.

References Cited

UNITED STATES PATENTS

| | | | |
|---|---|---|---|
| 2,245,102 | 6/1941 | Field | 29—472.1 XR |
| 2,774,213 | 12/1956 | Gantz | 59—93 |
| 2,998,646 | 9/1961 | Hitz | 29—482 XR |
| 3,027,615 | 4/1962 | Forney. | |
| 3,333,412 | 8/1967 | Rieger | 59—93 |

JOHN F. CAMPBELL, Primary Examiner

RICHARD BERNARD LAZARUS, Assistant Examiner

U.S. Cl. X.R.

29—472.1, 483; 59—93; 198—175